(12) United States Patent  (10) Patent No.: US 9,188,206 B2
Nishii et al.  (45) Date of Patent: Nov. 17, 2015

(54) TOROIDAL CONTINUOUSLY VARIABLE TRANSMISSION

(75) Inventors: Hiroki Nishii, Fujisawa (JP); Takashi Imanishi, Fujisawa (JP)

(73) Assignee: NSK LTD., Tokyo (JP)

( * ) Notice: Subject to any disclaimer, the term of this patent is extended or adjusted under 35 U.S.C. 154(b) by 2205 days.

(21) Appl. No.: 12/133,781

(22) Filed: Jun. 5, 2008

(65) Prior Publication Data

US 2008/0305920 A1   Dec. 11, 2008

(30) Foreign Application Priority Data

Jun. 6, 2007 (JP) .............................. P. 2007-149923
Jun. 7, 2007 (JP) .............................. P. 2007-151251

(51) Int. Cl.
F16H 15/38 (2006.01)
(52) U.S. Cl.
CPC ........... F16H 15/38 (2013.01); Y10T 29/49464 (2015.01)
(58) Field of Classification Search
USPC ......................................... 476/40, 46, 72, 73
See application file for complete search history.

(56) References Cited

U.S. PATENT DOCUMENTS

| 6,881,126 B2 | 4/2005 | Nakayama et al. | |
| 2002/0002098 A1* | 1/2002 | Oshidari et al. | 476/73 |
| 2006/0122030 A1* | 6/2006 | Nishii et al. | 476/73 |

FOREIGN PATENT DOCUMENTS

| DE | 10 2005 051 060 A1 | 5/2006 |
| EP | 1 167 819 A2 | 1/2002 |
| JP | 62274140 A | 11/1987 |
| JP | 2001254795 A | 9/2001 |
| JP | 2002-39306 A | 2/2002 |
| JP | 2003-130166 A | 5/2003 |
| JP | 2003-207009 A | 7/2003 |
| JP | 2003-278869 A | 10/2003 |
| JP | 2003-343675 A | 12/2003 |
| JP | 2004-138216 A | 5/2004 |
| JP | 2004138145 A | 5/2004 |

OTHER PUBLICATIONS

German Office Action dated Aug. 25, 2009.
Notification of Reason for Refusal issued Aug. 26, 2011 by the Japanese Patent Office in counterpart Japanese Patent Application No. 2007149923.
Notification of Reason for Refusal issued Aug. 26, 2011 by the Japanese Patent Office in counterpart Japanese Patent Application No. 2007151251.

* cited by examiner

*Primary Examiner* — William C Joyce
(74) *Attorney, Agent, or Firm* — Sughrue Mion, PLLC

(57) ABSTRACT

Power roller-side concave grooves are opposed to disk-side concave grooves 19, 19 so as to have angles therebetween in a rolling contact area between a peripheral surface of the power roller and a one-side surface 17 of a disk 16 in an axial direction regardless of a transmission gear ratio of a toroidal continuously variable transmission. Accordingly, the disk-side concave grooves 19, 19 are formed so as to have angles with respect to a circumferential direction of the disk 16 when viewed from a normal direction relative to the one-side surface 17 in the axial direction. Meanwhile, the power roller-side concave grooves are formed into a concentric shape (or a spiral shape) about a central shaft of the power roller. As a result, it is possible to prevent a decrease of a contact area in the rolling contact area regardless of the transmission gear ratio.

5 Claims, 14 Drawing Sheets

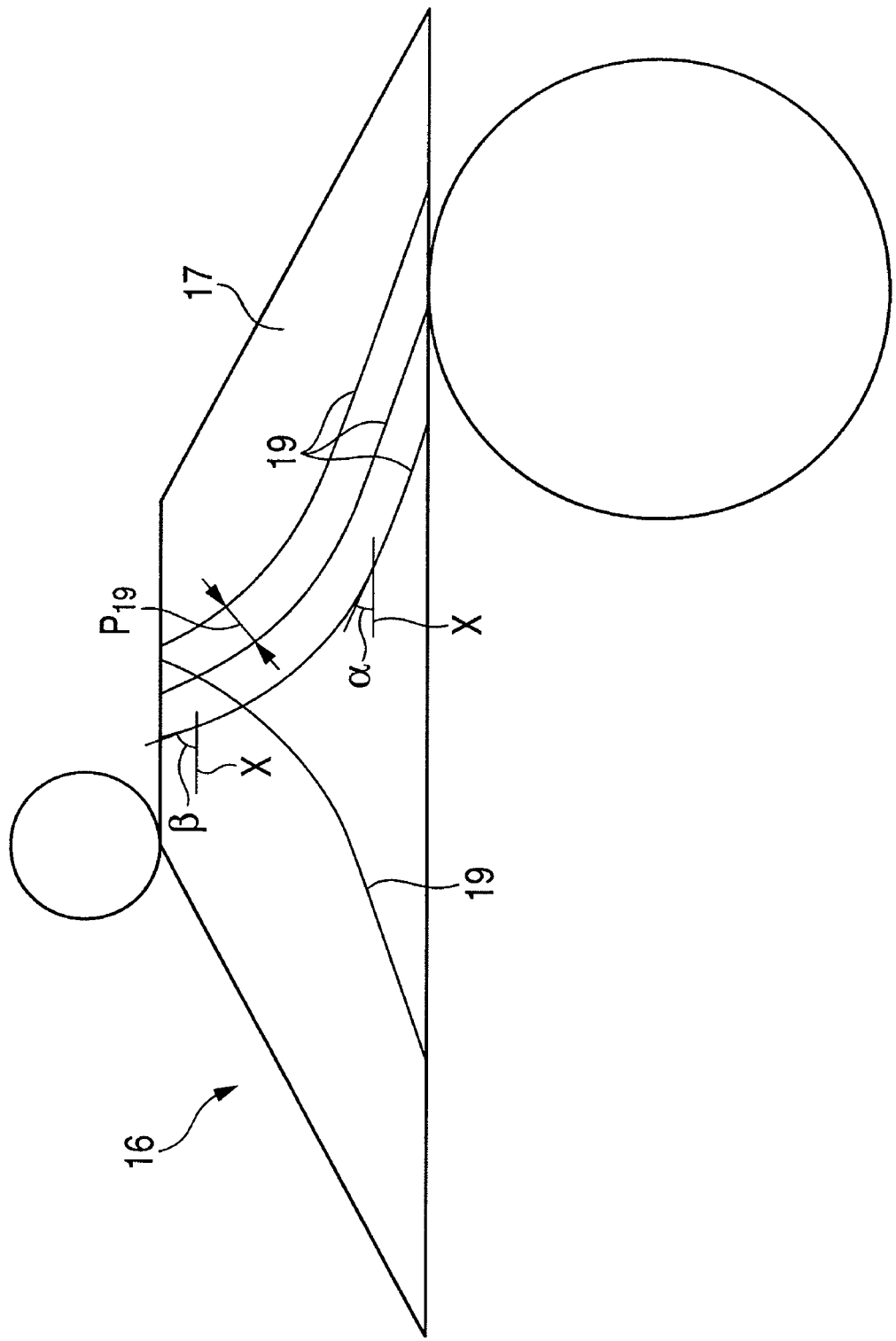

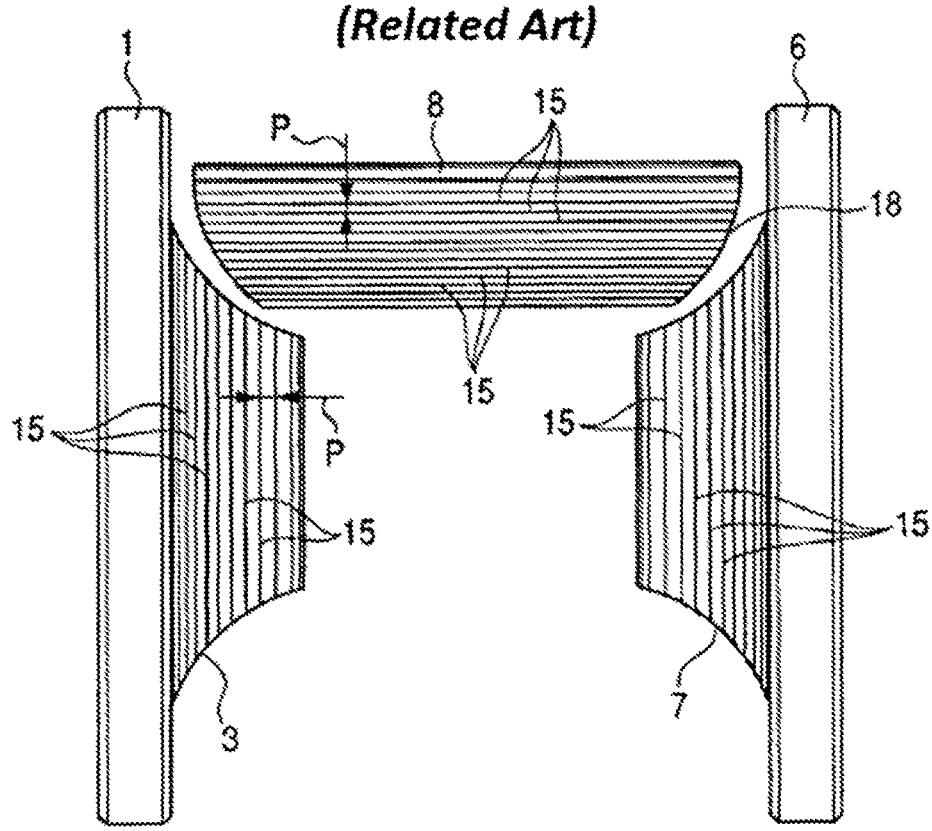

TOROIDAL CONTINUOUSLY VARIABLE TRANSMISSION

BACKGROUND OF THE INVENTION

1. Field of the Invention

The present invention relates to an improvement of a toroidal continuously variable transmission which is used as a transmission unit constituting an automatic transmission apparatus for a vehicle or as a transmission for adjusting the operation speeds of various kinds of industrial machines such as a pump. Specifically, the present invention provides a structure in which a plurality of concave grooves (fine grooves) are formed in both a peripheral of a power roller and a one-side surface of a disk in an axial direction in order to improve a traction coefficient of a rolling contact area between the axially one-side surface and the peripheral surface of the power roller while ensuring durability of the disk and the power roller. Further, the present invention provides such the concave grooves with low cost.

2. Description of Related Art

In some field, a toroidal continuously variable transmission is generally used as a transmission apparatus for a vehicle. FIGS. 9 and 10 show a basic configuration of the toroidal continuously variable transmission which is currently put to practical use. This toroidal continuously variable transmission is called as a double cavity type in which a pair of input-side disks 1 and 1 are rotatably supported to an input rotary shaft 2 while being concentric and interlocked with each other in a state that input-side inner surfaces 3 and 3 corresponding to one-side surfaces in an axial direction, which are formed into a toroidal curve surface (a circular-arc concave surface in a sectional view) and are opposed to each other.

In addition, an output cylinder 5 having an output gear 4 fixedly attached to an outer circumferential surface of a center portion thereof is supported to a position around a center portion of the input rotary shaft 2 so as to be rotatable about the input rotary shaft 2. Output-side disks 6 and 6 are supported to both end portions of the output cylinder 5 by a spline-engagement so as to be rotatable together with the output cylinder 5. In this state, output-side inner surfaces 7 and 7 of both the output-side disks 6 and 6 corresponding to one-side surfaces in the axial direction, which are formed into a toroidal curve surface, are opposed to both the input-side inner surfaces 3 and 3.

Two power rollers 8 and 8 having a spherical convex surface are disposed in a space (cavity) between both the input-side inner surface 3 and the output-side inner surface 7 around the input rotary shaft 2. The power rollers 8 and 8 are supported to inner surfaces of trunnions 9 and 9 through support shafts 10 and 10 each having a base half portion and a front half portion which are eccentric with each other and a plurality of rolling bearings so as to be rotatable in a direction of the front half portions of the support shafts 10 and 10 and be slightly swingable about the base half portions of the support shafts 10 and 10. The trunnions 9 and 9 are swingable about tilting shafts 11 and 11 which are provided at both end portions of the trunnions 9 and 9 in a longitudinal direction (an inside and outside direction in FIG. 9 and a vertical direction in FIG. 10) so as to be concentric with each other.

An operation in which the trunnions 9 and 9 swing (inclining) is carried out by displacing the trunnions 9 and 9 in the axial direction of the tilting shafts 11 and 11 by hydraulic actuators 12 and 12. That is, when a speed needs to be changed, the trunnions 9 and 9 are displaced in the axial direction of the tilting shafts 11 and 11 by pressure oil supplied to the actuators 12 and 12. As a result, a direction of a force acting in a direction perpendicular to the rolling contact area between the peripheral surfaces of the power rollers 8 and 8 and the input-side and output-side inner surfaces 3 and 7 is changed (side slip occurs), and then the trunnions 9 and 9 are displaced while swinging about the tilting shafts 11 and 11.

At the time of operating the toroidal continuously variable transmission described above, the input-side disk 1 on one side (on the left side in FIG. 9) is driven to rotate by a drive shaft 13 through a loading cam press unit 14. As a result, the pair of input-side disks 1 and 1 supported to both end portions of the input rotary shaft 2 rotate together while being pressed in a direction to be close to each other. Then, the rotation is transmitted to both the output-side disks 6 and 6 through the power rollers 8 and 8 and then is extracted from the output gear 4.

The operations at the time of changing a rotation speed ratio between the input rotary shaft 2 and the output gear 4 will be explained.

When a deceleration is carried out between the input rotary shaft 2 and the output gear 4, the trunnions 9 and 9 swing to a position shown in FIG. 9, and then the peripheral surfaces of the power rollers 8 and 8 are brought into direct contact with the center portions of the input-side inner surfaces 3 and 3 of the input-side disks 1 and 1 and the outer circumferential portions of the output-side inner surfaces 7 and 7 of both the output-side disks 6 and 6, respectively.

On the contrary, when an acceleration is carried out, the trunnions 9 and 9 swing in a direction opposite to that shown in FIG. 9, and then the peripheral surfaces of the power rollers 8 and 8 are brought into direct contact with the outer circumferential portions of the input-side inner surfaces 3 and 3 of both the input-side disks 1 and 1 and the center portions of the output-side inner surfaces 7 and 7 of both the output disks 6 and 6.

When the swing angle of the trunnions 9 and 9 is set to an intermediate value, it is possible to obtain an intermediate speed ratio between the input rotary shaft 2 and the output gear 4.

At the time of operating the toroidal continuously variable transmission described above, in the rolling contact area (traction area) between the peripheral surfaces of the power rollers 8 and 8 and the input-side and output-side inner surfaces 3 and 7 of the input-side and output-side disks 1 and 6, a power is transmitted through a traction oil. Here, a friction coefficient (traction coefficient) of the traction oil is a constant value, and it is necessary to apply a large pressing force to the rolling contact area in order to transmit a large torque in the rolling contact area.

However, when applying such a large pressing force, durability of the input-side and output-side disks 1 and 6 or the power rollers 8 and 8 may deteriorate. In addition, in order to ensure strength of the disks 1 and 6 or the power rollers 8 and 8, the members 1, 6, and 8 may increase in size, which is not desirable to realize a decrease in size of the apparatus.

Meanwhile, in order to prevent the above-described problems, for instance, Japanese Patent Unexamined Publications JP-A-2002-39306, JP-A-2003-207009, JP-A-2003-278869 and JP-A-2003-343675 disclose a technique in which a plurality of concave grooves having a depth in the range of 0.1 $\mu$m to 8 $\mu$m are formed in the whole one-side surfaces of the disks 1 and 6 or the peripheral surface (traction surface) of the power roller 8 so as to intersect each other. When such a technique is adopted, it is possible to improve a traction coefficient of the rolling contact area, and thus it is thought that large torque can be transmitted by a small pressing force compared with a structure without such concave grooves.

In this case, when a traction coefficient is largely improved to obtain a high capacity (an increase in allowable transmission torque) with such a structure, for instance, the depth of the concave groove may be set to large (deep).

However, when the depth of the concave grooves is set to large (deep), it is difficult to ensure durability of a working tool for forming the concave grooves, and thus a manufacture cost may increase. In addition, when the concave grooves are formed by, for instance, a rolling process, a traction surface corresponding to the surface to be processed may be broken or bending fatigue thereof may deteriorate. On the contrary, for instance, when the concave grooves are formed in both the one-side surfaces of the disk 1 and 6 in the axial direction and the peripheral surface of the power roller 8, it is possible to remarkably improve a traction coefficient even when the depth of the concave grooves is not extremely large (deep). However, when the concave grooves are formed in both surfaces of the disks 1 and 6 and the power roller 8, durability of the disks 1 and 6 or the power roller 8 may not be ensured just by simply forming the concave grooves in the surface (traction surface). Regarding this point, a description thereof will be carried out hereinafter.

That is, in the structure disclosed in the JP-A-2002-39306, JP-A-2003-207009, JP-A-2003-278869 and JP-A-2003-343675, the plurality of concave grooves are formed in the peripheral surfaces of the power rollers 8 or the one-side surfaces of the disks 1 and 6 in the axial direction so as to have a spiral shape or a concentric shape about the central shaft (rotation shaft) of the member. Here, for instance, as shown in FIG. 11, it may be supposed that concave grooves 15 and 15 with a concentric shape are formed in a peripheral surface 18 of the power roller 8 and one-side surfaces 3 and 7 of disks 1 and 6. In addition, FIG. 11 is a schematic view in which the concave grooves 15 and 15 are enlarged for the convenience of understanding the formation state of the concave grooves 15 and 15 (a relationship between a groove width and a groove pitch P of the concave grooves 15 is larger than an actual relationship). In fact, the depth of the concave grooves 15 and 15 is in the range of 0.1 to 8 μm or so, the groove width thereof is in the range of 10 to 500 μm or so, and the groove pitch thereof is in the range of 25 to 500 μm. Then, in a structure in which the concave grooves 15 and 15 are formed into a concentric shape, a contact area of the rolling contact area between the one-side surfaces 3 and 7 of the disks 1 and 6 and the peripheral surface 18 of the power roller 8 may not be sufficiently ensured in accordance with a transmission gear ratio between the disks 1 and 6, that is, an inclination angle of the power rollers 8 and 8.

That is, as described above, in the structure in which the concave grooves 15 and 15 are formed into a concentric shape, the concave grooves 15 and 15 are opposed to each other in parallel in the rolling contact area. Here, as shown in FIG. 12A which schematically showing a contact state of the rolling contact area, when the concave grooves 15 and 15 are opposed to each other having the same positional relationship with each other, a problem that a substantial contact area of the rolling contact area (a total sum of a contact area in the rolling contact area other the concave grooves 15 and 15) becomes smaller than a necessary area does not occur.

However, as shown in FIG. 12B, since a positional relationship between the concave grooves 15 and 15 is deviated in accordance with the transmission gear ratio between the disks 1 and 6, a substantial contact area in the rolling contact area may decrease. In addition, although it is not shown in the drawing, even when the concave grooves with a spiral shape are formed in the traction surface, since the concave grooves in the rolling contact area are opposed to each other in parallel, the substantially same problem as that of the concave grooves 15 and 15 with the concentric shape may occur (the substantial contact area may decrease for the same reason because the concave grooves are opposed to each other with slightly different parallelism).

Then, when the contact area becomes small in this way, a surface pressure of the rolling contact area increases, and thus in a remarkable state, a metal contact may occur between the traction surfaces in the rolling contact area. The transmission gear ratio between the disks 1 and 6 changes in accordance with an operation state. However, for instance, during a constant-speed operation, the operation is carried out in a state that the transmission gear ratio is constant. Then, in such a state, when the contact area in the rolling contact area becomes small, durability of the disks 1 and 5 or the power rollers 8 and 8 may deteriorate, which is not desirable.

SUMMARY OF THE INVENTION

The present invention is contrived in consideration of the above-described problems, and one of objects of the invention is to provide a structure in which a plurality of concave grooves (fine grooves) are formed in both a peripheral surface of a power roller and a one-side surface of a disk in an axial direction in order to improve a traction coefficient of a rolling contact area between the axially one-side surface and the peripheral surface of the power roller while ensuring durability of the disk and the power roller. Further, the present invention also relates to provide a construction for achieving the plurality of the concave grooves with low cost and relates to a manufacturing method of the plurality of concave grooves with low cost.

According to the present invention, there is provided a toroidal continuously variable transmission, including:

a pair of disks having an axially one-side surface of which sectional shape is toroidal, respectively, the disks being supported rotatably and concentrically with each other in a state that the respective axially one-side surface opposes to each other; and a plurality of power rollers arranged along with a circumferential direction of the disks between the respective axially one-side surface, the respective power rollers having a peripheral surface being made contact with the axially one-side surface of the disk, wherein plurality of disk-side concave grooves are formed on the axially one-side surface of the disk, plurality of power roller-side concave grooves are formed on the peripheral surface of the power roller and regardless of a transmission ratio (regardless of the tilting angle of the power roller), at a rolling contact area between the disk and the power roller, the disk-side concave grooves and the power roller-side grooves are in a distortional relation.

Note that the depth of the concave grooves formed on the peripheral surface of the power roller or the axially one-side surface is, for example, 8 μm or less, preferably 5 μm or less, and more preferably, 0.5 to 3.0 μm. It is more preferable that the concave grooves are arranged so as to intersect each other.

According to the present invention, preferably, the disk-side concave grooves are formed on only a radially part of the axially one-side surface of the disk so that the disk-side concave grooves do not continuously meet with the power roller-side concave grooves. Particularly, a part of the axially one-side surface, which contacts with the peripheral surface of the power roller when the transmission ratio is certain value which requires certain traction coefficient.

According to the present invention, more preferably, at the rolling contact area, when viewed from a normal direction relative to the rolling contact area, the disk-side concave grooves intersect with the power roller-side concave grooves at angles of 5 to 90 degree, preferably, the angles of 5 to 45 degree. More preferably, the angle is set to be 10 to 45 degree, 20 to 45 degree, 30 to 45 degrees.

According to the present invention, there is provided a toroidal continuously variable transmission, including:

a pair of disks having an axially one-side surface of which sectional shape is toroidal, respectively, the disks being supported rotatably and concentrically with each other in a state that the respective axially one-side surface opposes to each other; and a plurality of power rollers arranged along with a circumferential direction of the disks between the respective axially one-side surface, the respective power rollers having a peripheral surface being made contact with the axially one-side surface of the disk, wherein plurality of disk-side concave grooves are formed on the axially one-side surface of the disk, plurality of power roller-side concave grooves are formed on the peripheral surface of the power roller, when viewed from a normal direction relative to a surface on which the respective concave grooves are formed, at least one of the disk-side concave grooves and the power roller-side concave grooves intersects with a circumferential direction of the disk or the power roller at certain angles and the concave grooves are arranged such that the angle defined between the concave groove of radially inner side and the circumferential direction is larger than the angle defined between the concave groove of radially outer side.

Furthermore, according to the present invention, there is provided a manufacturing method of a toroidal continuous variable transmission which includes:

a pair of disks having an axially one-side surface of which sectional shape is toroidal, respectively, the disks being supported rotatably and concentrically with each other in a state that the respective axially one-side surface opposes to each other; and a plurality of power rollers arranged along with a circumferential direction of the disks between the respective axially one-side surface, the respective power rollers having a peripheral surface being made contact with the axially one-side surface of the disk, wherein plurality of disk-side concave grooves are formed on the axially one-side surface of the disk, plurality of power roller-side concave grooves are formed on the peripheral surface of the power roller, when viewed from a normal direction relative to a surface on which the respective concave grooves are formed, at least one of the disk-side concave grooves and the power roller-side concave grooves intersects with a circumferential direction of the disk or the power roller at certain angles and the concave grooves are arranged such that the angle defined between the concave groove of radially inner side and the circumferential direction is larger than the angle defined between the concave groove of radially outer side, the manufacturing method including:

rotating a work, to which the concave groove are formed, at a constant speed;

bringing a tool (cutting tool for machining grooves or grind stone) for forming the concave groove to a worked surface of the work; and moving (oscillating or displacing) the tool in a radial direction of the work (and also longitudinal direction) at a constant speed while rotating the work at constant speed and keeping a contact between the tool and the work.

According to the toroidal continuously variable transmission described above, it is possible to provide the structure provided with a plurality of concave grooves improving a traction coefficient while ensuring durability of the disk and the power roller.

That is, since the concave grooves are formed in both the axially one-side surface and the peripheral surface of the power roller (both traction surfaces), it is possible to ensure a sufficient traction coefficient even when the depth of the concave grooves is small (is not extremely deep). Accordingly, it is possible to easily ensure durability of the working tool for forming the concave grooves, and thus it is possible to reduce a manufacture cost. In addition, when the concave grooves are formed by a rolling process, it is possible to prevent the processed surface where the concave grooves are formed from being broken, and to prevent bending fatigue from deteriorating.

In addition, as described above, the power roller-side concave grooves formed in the peripheral surface of the power roller are opposed to the disk-side concave grooves formed in the axially one-side surface in the rolling contact area (traction area) between the peripheral surface of the power roller and the axially one-side surface regardless of the transmission gear ratio between the disks. Accordingly, for instance, a problem that a substantial contact area of the rolling contact area (a total sum of a contact area in the rolling contact area other the concave grooves) becomes small at a certain transmission gear ratio does not occur. Accordingly, it is possible to prevent an excessive large surface pressure or a metal contact in the rolling contact area occurring upon operating the apparatus in a state that the contact area is extremely small, and thus it is possible to ensure durability of the disk and the power roller.

In addition, as described above, in order to make the disk-side and power roller-side concave grooves in the distortional relation, at least one concave grooves of the power roller-side concave grooves intersects with the disk-side concave grooves viewed from a normal direction relative to a surface on which the respective concave grooves are formed (a concave surface or convex surface in a sectional view) with certain angles. Then, in this case, when the angles are formed such that the angle defined between the concave groove of radially inner side and the circumferential direction is larger than the angle defined between the concave groove of radially outer side.

In other words, when considering concentric circles of which common center is a rotation center of the disk or the power roller, the angle is also defined between the concave groove and concentric circle. In this case, the concave grooves are arranged such that an intersecting angle defined between the concave groove and an inner-side concentric circle is larger than an intersecting angle defined between the concave groove and an outer-side concentric circle.

When arranging the concave grooves as described above, it is possible to form the concave grooves at low cost. The reason is because the concave grooves can be formed by rotating the member where the concave grooves need to be formed at a constant speed while displacing (swinging) the working tool at a constant speed in the diameter direction (and in the axial direction) of the member where the concave grooves need to be formed in a state that the working tool (a groove forming cutting tool such as a precision-work bite or a grinding tool such as a super-finishing grindstone) for forming the concave grooves are brought into direct contact with the surface to be processed. In addition, the reason why the concave grooves can be formed by rotating the disk at a constant speed while displacing the working tool at a constant speed that a circumferential speed of the part processed by the working tool changes such that a circumferential speed on the outer diameter side is faster than that on the inner diameter side. Accordingly, an angle with respect to the circumferential direction becomes small as much as the circumferential speed is fast.

For this reason, since it is not necessary to change a rotation speed of the member where the concave grooves need to be formed or to change a displacement speed of the working tool upon processing the concave grooves, it is not necessary to provide a mechanism for changing a rotation speed to the processing device. In addition, since it is possible to reduce a cost of the processing device as much as a cost of the mechanism which is not provided thereto, it is possible to reduce a cost for forming the concave grooves.

BRIEF DESCRIPTION OF THE DRAWINGS

FIG. 2 is a schematic view illustrating a state that the disk is developed and a part of concave groove is omitted;

FIG. 11 is a schematic view illustrating a possibility that a problem occurs in a structure with a groove;

DETAILED DESCRIPTION OF THE PREFERRED EMBODIMENTS

First Embodiment

Figure 3A:
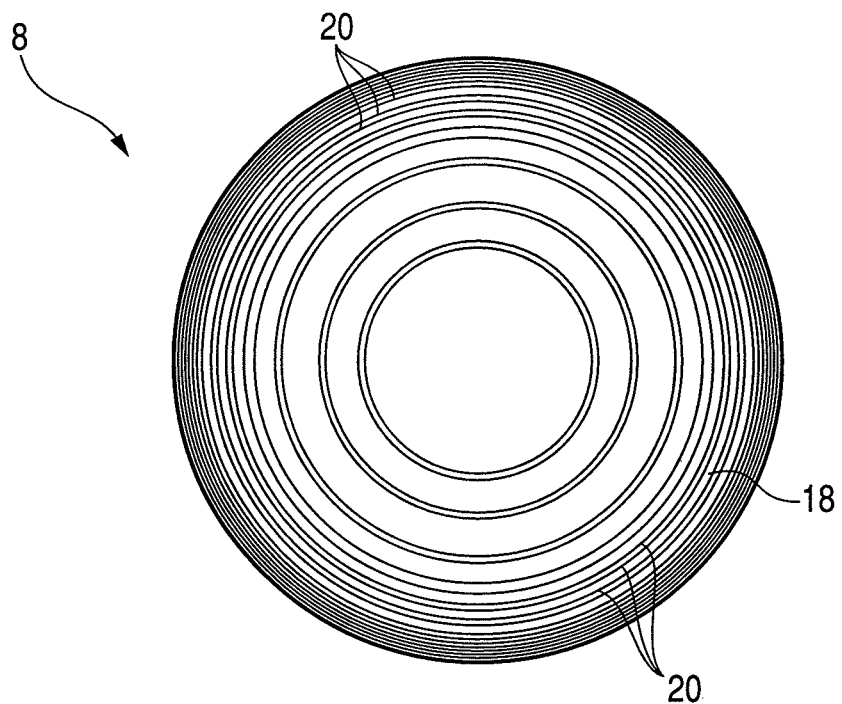
FIG. 3A is a top view of the power roller of the first embodiment in which the groove is enlarged.
Figure 3B:
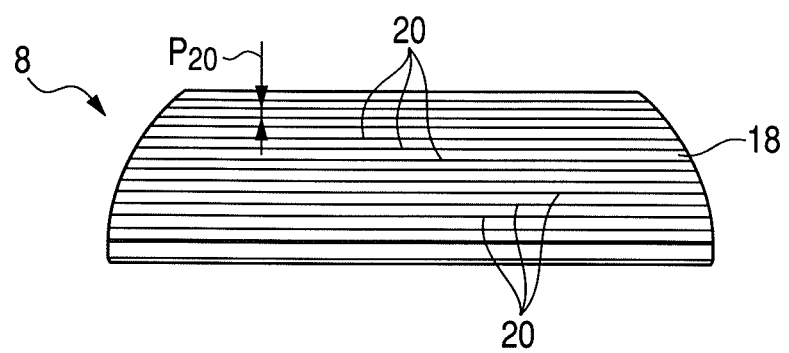
FIG. 3B is a side view of the power roller of the first embodiment in which the groove is enlarged.
Figure 9:
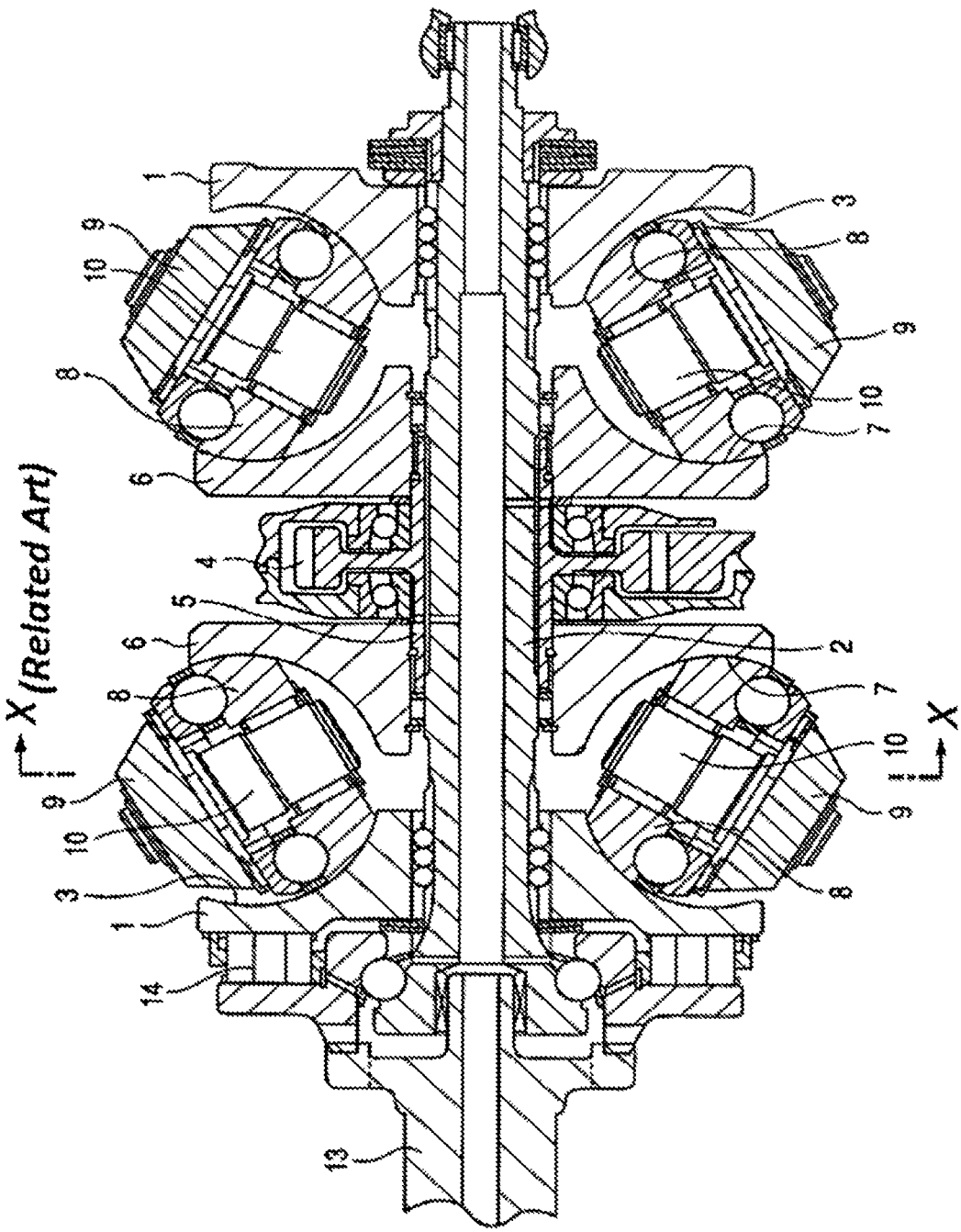
FIG. 9 is a sectional view shows an example of the known structure 1.
Figure 10:
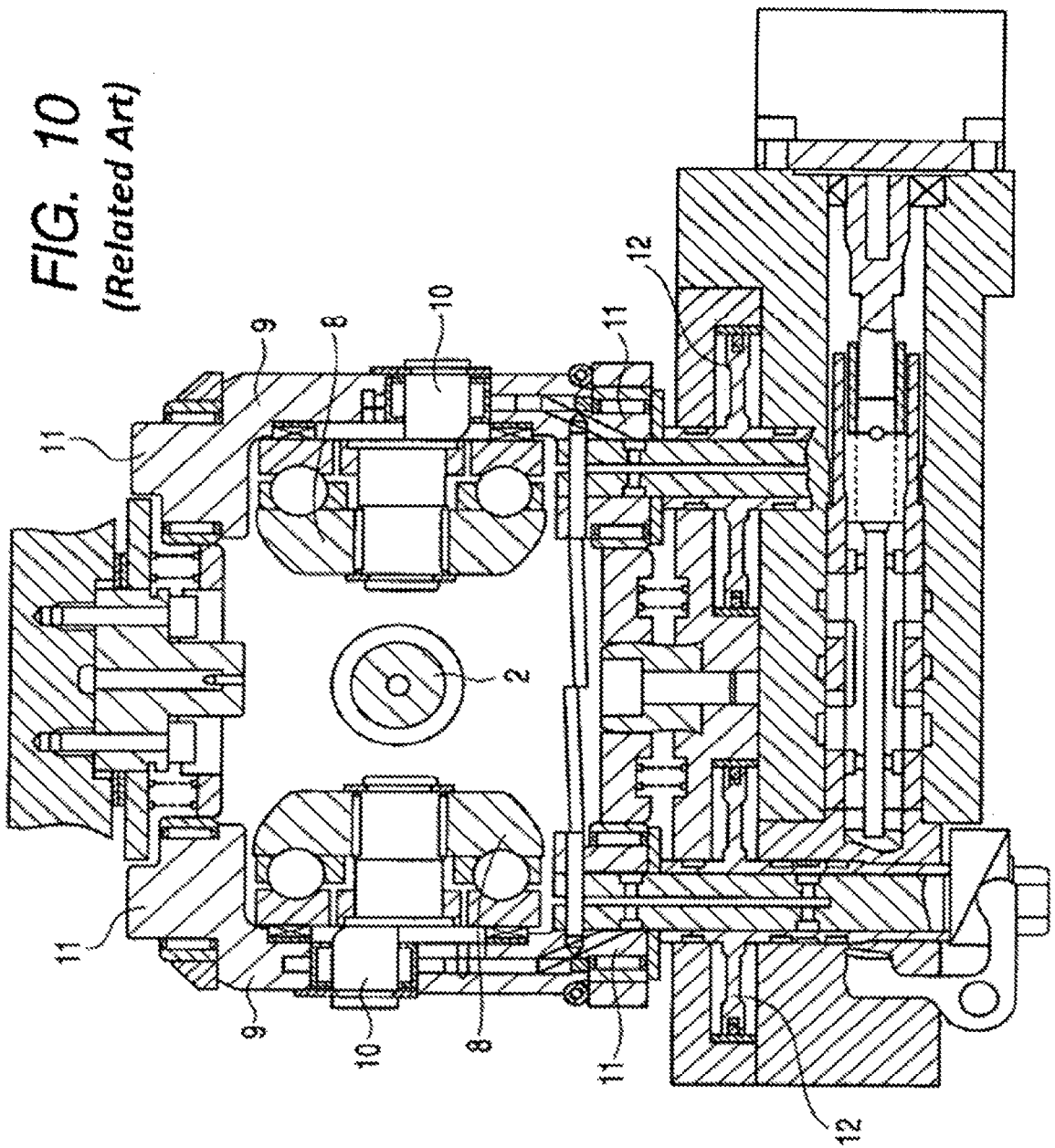
FIG. 10 is a view taken along the line X-X shown in FIG. 9.

FIGS. 1 to 3 show a first embodiment of the invention. In addition, a characteristic of this embodiment is to study a principle of concave grooves 19, 20 in order to provide a structure with a plurality of concave grooves 19, 20 improving a traction coefficient while ensuring durability of a disk 16 (which corresponds to an input-side disk 1 and an output-side disk 6 shown in FIG. 9) and a power roller 8. Since the other structures and effects are the same as those of the known example described in FIGS. 9 and 10, the repetitive drawings and descriptions thereof will be omitted or described in brief. Hereinafter, a characteristic part of this embodiment will be mainly described.

Figure 1A:
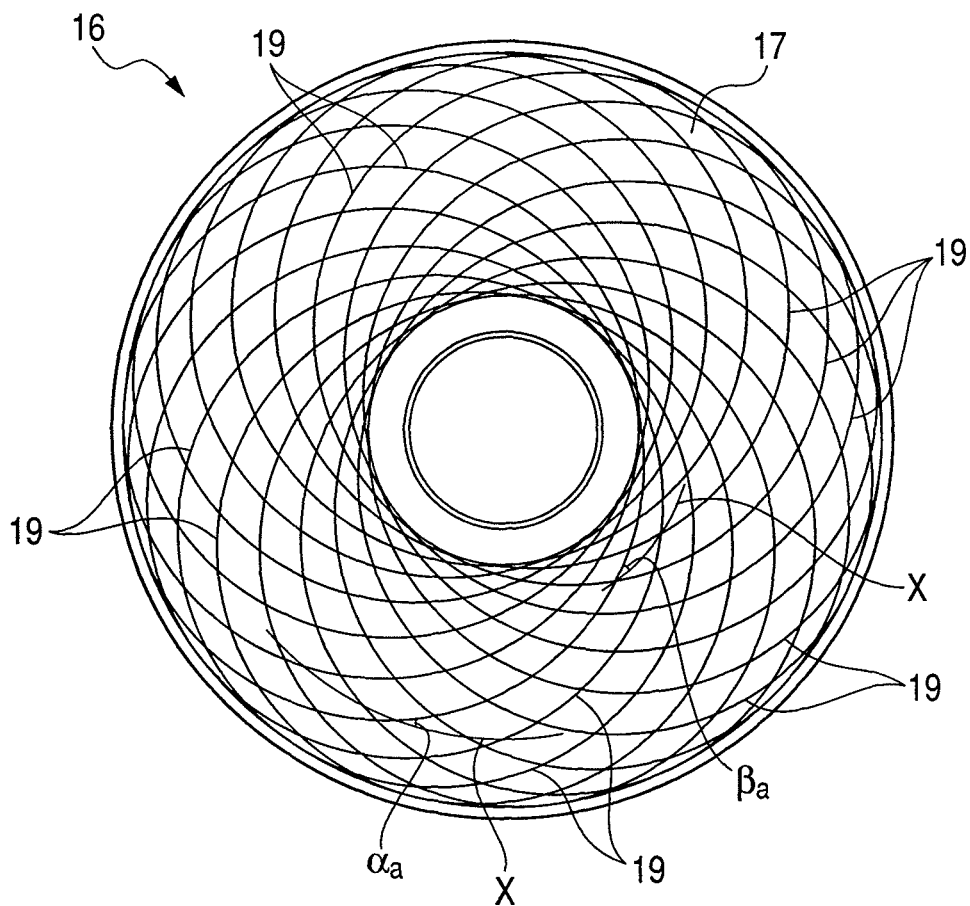
FIG. 1A is a top view of a disk of the first embodiment in which a concave grove is enlarged.
Figure 1B:
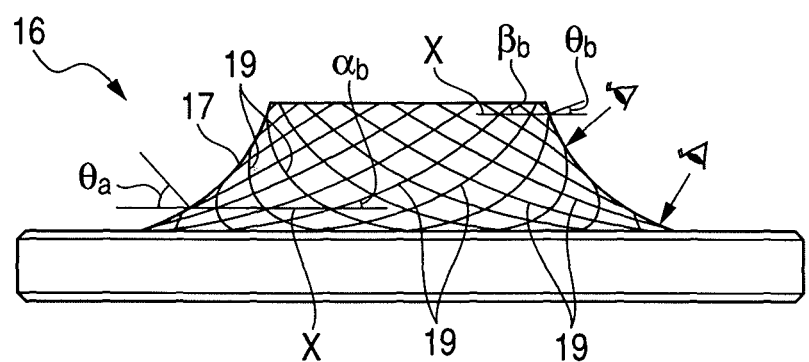
FIG. 1B is a side view of the disk of the first embodiment in which a concave grove is enlarged.

In this embodiment, as shown in FIGS. 1 and 2, a plurality of concave grooves 19, 19 are formed in a whole one-side surface 17 (which corresponds to a surface shown in FIGS. 1A and 2, an upper surface shown in FIG. 1B, an input-side inner surface 3, and an output-side inner surface 7 shown in FIG. 9) of a disk 16 which constitutes a toroidal continuously variable transmission according to this embodiment in an axial direction. At this time, for instance, the concave grooves 19, 19 have a depth of 8 µm or less, desirably 5 µm or less, and even more desirably in the range of 0.5 to 3.0 µm. In addition, in the peripheral surface 18 of the power roller 8 shown in FIGS. 3A and 3B, a plurality of power roller-side concave grooves 20, 20 are formed in a whole peripheral surface 18. At this time, for instance, the power roller-side concave grooves have a depth of 8 µm or less, desirably 5 µm or less, and even more desirably in the range of 0.5 to 3.0 µm.

In addition, in FIGS. 1A to 3B (and FIGS. 4A to 8B described below), like FIG. 11 described above, for the convenience of understanding the formation state of the concave grooves 19, 20, the concave grooves 19, 20 are enlarged and schematically shown such that a relationship between a groove width and a groove pitches $P_{19}$ and $P_{20}$ (see FIG. 2) of the concave grooves 19, 20 is larger than an actual relationship thereof. In actual case, as described above, the depth of the concave grooves 19, 20 is 8 µm or less, desirably 5 µm or less, and even more desirably in the range of 0.5 to 3.0 µm, the groove width is in the range of 10 to 500 µm, and the groove pitches $P_{19}$ and $P_{20}$ are in the range of 25 to 500 µm. Then, the concave grooves 19, 20 are formed in the one-side surface 17 of the disk 16 and the peripheral surface 18 of the power roller 8 by a cutting process using a precision-work bite. At this time, the one-side surface 17 is formed into a smooth surface by a super-finishing work. In addition, as described below, the groove width of the disk-side concave grooves 19, 19 may be the same or different from that of the power roller-side concave grooves 20, 20.

In any case, in this embodiment, the power roller-side concave grooves 20, 20 and the disk-side concave grooves 19, 19 are in a distortional relation. That is, the power roller-side concave grooves 20, 20 are opposed to the disk-side concave grooves 19, 19 while forming angles with respect to each other when viewed from normal direction relative to a rolling contact area (traction area) between the peripheral surface 18 of the power roller 8 and the one-side surface 17 of the disk 16 regardless of a transmission gear ratio between the disks 16 (between the input-side disk 1 and the output-side disk 6). For instance, the angle is in the range of 5 to 90 degree and more desirably in the range of 5 to 45 degree.

Figure 13:
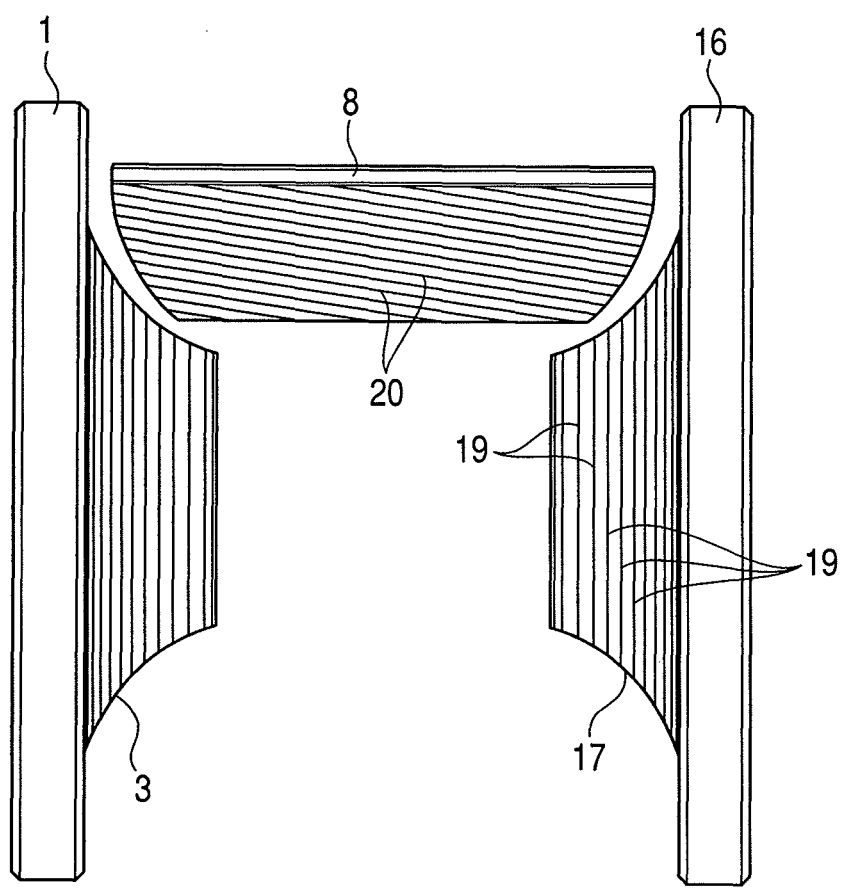
FIG. 13 is a schematic view of the arrangement of the power roller and disks illustrating one example of the present invention and FIG. 14 is a schematic view of the arrangement of the power roller and disks illustrating another example of the present invention.
Figure 14:
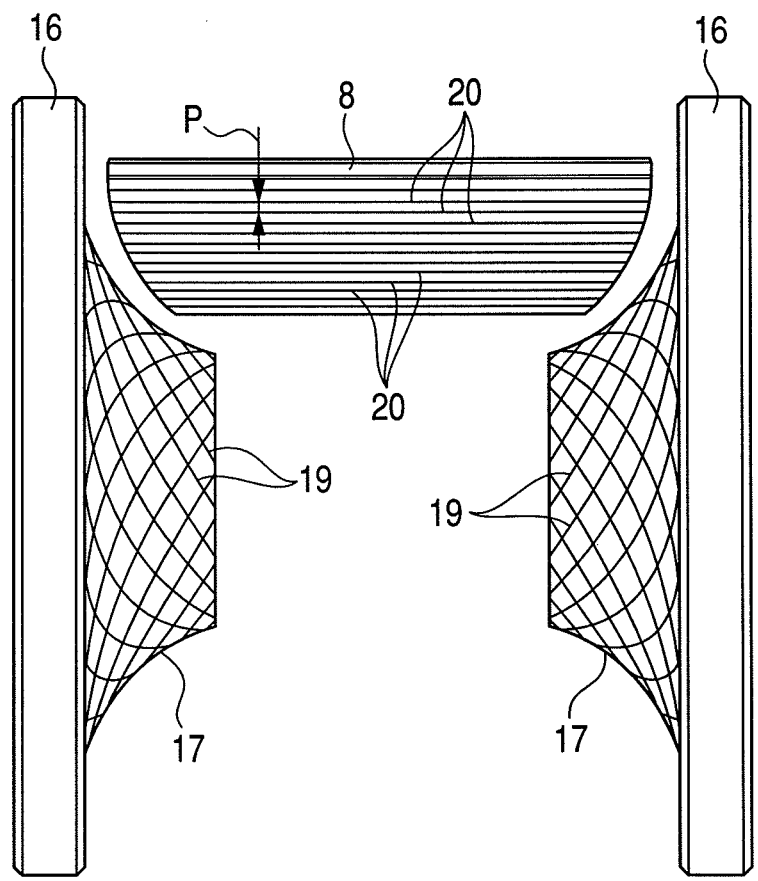

As for concrete constructions of the above concepts, embodiments shown in FIGS. 13 and 14 are exemplified. That is, as shown in FIG. 13, a configuration that the disk-side concave grooves 19 are made parallel to the circumferential direction of the disk 16 and the power roller-side concave grooves 20 intersect with the circumferential direction with constant angle, is adaptable for the present invention. As one of other embodiments, as shown in FIG. 14, a configuration that the disk-side concave grooves 19 illustrated in FIG. 1B are applied to both of the disk-side and power roller-side concave grooves 19, is also adaptable.

That is, when locally viewing only a micro rolling contact area defined between the disk 15 and the power roller 8, within this local micro area, the disk-side concave grooves 19 are not parallel to the power roller-side concave grooves 20 and these concave grooves 19, 20 are in distortional relation. According to this configuration, when the disk 15 and power roller 8 rotate together, there is no case that they continuously contact each other with such a small contact area shown in FIG. 12B.

Figure 12A:
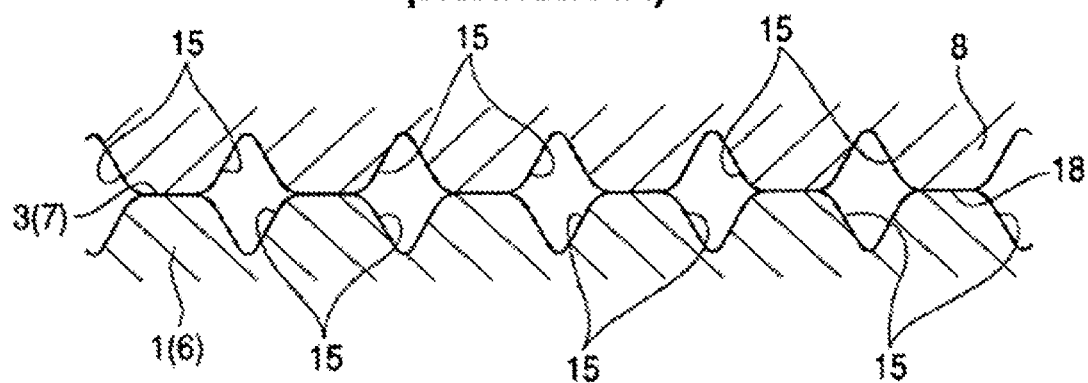
FIG. 12A is an enlarged sectional view of a rolling contact area between the disk and the power roller, which shows a large contact state between the disk and the power roller.
Figure 12B:
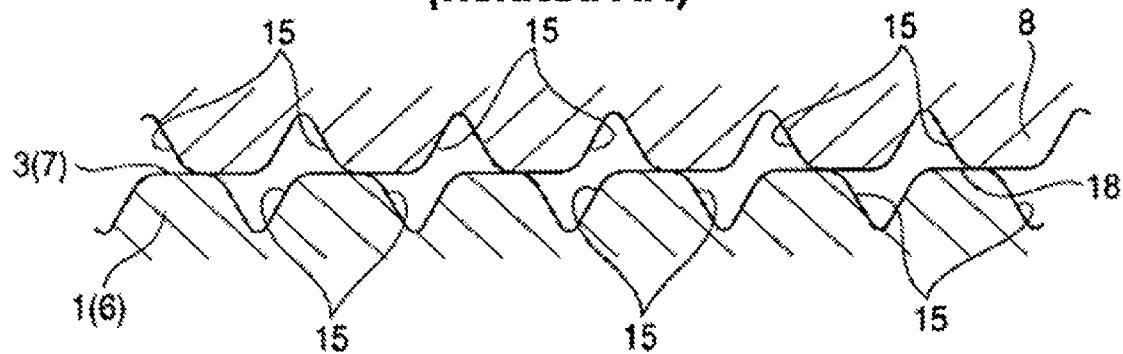
FIG. 12B is an enlarged sectional view of a rolling contact area between the disk and the power roller, which shows a small contact state.

In detail, although the contact area between the disk 15 and the power roller 8 is relatively small as shown in FIG. 12B at one time, when a certain time elapses and the disk 15 and power roller 8 rotate together, the positional relation between the concave grooves 19, 20 are changed into a state shown in FIG. 12A which is large in the contact area. Thus, there is no case that the disk 15 and the power roller 8 continuously contact each other with a small contact area.

Accordingly, because during rotation of the disk 15 and the power roller 8, there is no case that the disk 15 and the power roller 8 continuously contact each other in the small contact area and thus large contacting pressure is not continuously applied to the disk 15 and the power roller 8. Therefore, the case that only a certain part of the disk 15 and power roller 8 receives extremely large damage can be avoided.

Note that it goes without saying that the present invention is not limited to the embodiments shown in FIGS. 13 and 14. As long as the disk-side concave groove 18 and the power roller-side concave groove are in distortional relation when locally viewing only the micro contact area between the disk 15 and the power roller 8 and they do not continuously contact each other with a small contact area during their rotation, such the configurations are included in the scope of the present invention.

For achieving the above construction, especially for forming the disk-side and power roller-side concave grooves 19, 20 which are not made parallel to each other, one example of construction and method will be explained.

In this embodiment, the power roller-side concave grooves 20, 20 are formed into a concentric shape (or a spiral shape) about the central shaft (rotation shaft) of the power roller 8. Meanwhile, the disk-side concave grooves 19, 19 are formed so as to form angles $\alpha$ and $\beta$ (see FIG. 2) with respect to the circumferential direction of the disk 16 when viewed from a normal direction relative to the one-side surface 17 in the axial direction (see a view line shown in FIG. 1B). In other words, the disk-side concave grooves 19, 19 form (have) the angles $\alpha$ and $\beta$ with respect to an imaginary concentric circle X shown in the one-side surface 17 in the axial direction, the imaginary concentric circle X being formed about the central shaft of the disk 16. Then, the angles $\alpha$ and $\beta$ are formed such that an angle on the inside in the diameter direction (on the inner diameter side) of the disk 16 is larger than an angle on the outside in the diameter direction (on the outer diameter side) thereof.

That is, as shown in FIG. 2 in which the disk 16 is developed, the angles $\alpha$ and $\beta$ formed between the disk-side concave grooves 19, 19 and the imaginary concentric circle X which corresponds to the circumferential direction of the disk 16 are formed such that the angle $\beta$ on the inner diameter side is larger than the angle $\alpha$ on the outer diameter side ($\alpha<\beta$). In addition, the development view shown in FIG. 2 is a view in which a concave curve surface as the one-side surface 17 of the disk 16 is developed into a plane in the same way as a case that a surface of the earth is shown as a plane map of the world by the Mercator projection. The imaginary concentric circle X is in parallel to the horizontal direction of the sheet of FIG. 2 (the imaginary concentric circle X corresponds to a latitude line of the world map). Then, the angles $\alpha$ and $\beta$ shown in the developed view of FIG. 2 correspond to the angles $\alpha$ and $\beta$ when viewed from a normal direction relative to the one-side surface 17, and the angles $\alpha$ and $\beta$ are regulated to meet the relationship of $\alpha<\beta$.

In addition, FIG. 1A shows a state that the disk 16 is viewed from the small-diameter side in the axial direction. The angles $\alpha_a$ and $\beta_a$ shown in FIG. 1A are angles in appearance when the disk 16 is viewed in the axial direction. In addition, FIG. 1B shows a state that the disk 16 is viewed from the outer side in the diameter direction (side view). The angles $\alpha_b$ and $\beta_b$ shown in FIG. 1B are angles in appearance when the disk 16 is viewed in the diameter direction. Then, the angles $\alpha$, $\alpha_a$, and $\alpha_b$ and the angles $\beta$, $\beta_a$, and $\beta_b$ correspond to the same positions (positions where angles $\theta_\alpha$ and $\theta_\beta$ are formed between a line perpendicular to the one-side surface 17 and an imaginary plane intersecting with the central shaft of the disk 16 at a right angle) with respect to the diameter direction of the disk 16, respectively.

In this embodiment, the disk-side concave grooves 19, 19 are formed in the manner as below. That is, a working tool (a groove forming cutting tool such as a precision-work bite or a grinding tool such as a super-finishing grindstone) for forming the disk-side concave grooves 19, 19 is brought into direct contact with the one-side surface 17 to be processed while rotating the disk 16 at a constant speed. In this state, the working tool swings (or moves along the surface to be processed) in the diameter direction (and the axial direction) of the disk 16 at a constant speed. Then, in this way, when the working tool swings or moves at a constant speed while rotating the disk 16 at a constant speed, the disk-side concave grooves 19, 19 are formed in the one-side surface 17 so as to have angles with respect to the circumferential direction of the disk 16 (angles formed between the imaginary concentric circle X and the disk-side concave grooves 19, 19) such that an angle on the inner diameter side of the disk 16 is larger than that on the outer diameter side thereof when viewed from a normal direction relative to the one-side surface 17.

By adjusting a rotation speed of the disk 16, an axial speed of the working tool, and a diameter speed thereof, it is possible to regulate the pitches of the concave grooves 19, 20 or the angle size within a desired value. In addition, when the concave grooves 19, 20 are formed by the cutting tool, it is possible to use a CBN grindstone (CBN: cubic boron nitride) of which a front end R (curvature radius) is small (for instance, R0.1 or R0.2 or so) or a ceramic tip. When the concave grooves 19, 20 are formed by the super-finishing grindstone, concave portions are formed by a rough grindstone having a grain size in the range of #80 to #200. Subsequently, in order to finish convex portions in the processed surface while forming the concave portions into the concave grooves, one or more of a super-finishing work, a lapping work, and a peening work are carried out.

By adjusting a rotation speed of the disk 16, an axial speed of the working tool, and a diameter speed thereof, it is possible to regulate the pitches $P_{19}$ of the disk-side concave grooves 19, 19 or the size of angles α and β within a desired value. In addition, if necessary, it is possible to change a rotation speed of the disk 16 or to change a displacement speed of the working tool. At this time, when the processing is carried out at a constant speed, it is not necessary to provide a mechanism for changing a rotation speed to the processing device. Accordingly, it is possible to simplify the configuration of the apparatus, and thus it is possible to reduce a cost for forming the concave grooves. In addition, the disk-side concave grooves 19, 19 or the power roller-side concave grooves 20, 20 may be formed by a rolling process. The disk-side concave grooves 19, 19 may have angles with respect to the circumferential direction of the disk 16 when viewed from a normal direction relative to the one-side surface 17 in the axial direction, but are not limited to the principle shown in FIGS. 1 and 2. When the disk-side concave grooves 19, 19 and the power roller-side concave grooves 20, 20 are formed by a cutting process, the grinding process is carried out after the cutting process if necessary to remove small burrs formed on the processed surface.

According to this embodiment described above, it is possible to provide the structure provided with the plurality of concave grooves 19, 20 improving a traction coefficient while ensuring durability of the disk 16 and the power roller 8.

That is, since the concave grooves 19, 20 are formed in both the one-side surface 17 of the disk 16 in the axial direction and the peripheral surface 18 of the power roller 8 (both traction surfaces), it is possible to sufficiently ensure a traction coefficient even when the depth of the concave grooves 19, 20 is small (the depth is not made extremely large). Accordingly, it is possible to easily ensure durability of the working tool for forming the concave grooves 19, 20 and thus to reduce a manufacture cost. In addition, when the concave grooves 19, 20 are formed by a rolling process, it is possible to prevent the processed surface where the concave grooves 19, 20 are formed from being broken and to prevent bending fatigue from deteriorating.

In addition, in this embodiment, as described above, the power roller-side concave grooves 20, 20 and the disk-side concave grooves 19, 19 are in the distortion relation. Accordingly, for instance, a problem that a substantial contact area of the rolling contact area (a total sum of a contact area in the rolling contact area other than the concave grooves 19, 20) becomes small at a certain transmission gear ratio does not occur. Accordingly, it is possible to prevent an excessive large surface pressure or a metal contact in the rolling contact area occurring upon operating the apparatus in a state that the contact area is small, and thus it is possible to ensure durability of the disk 16 and the power roller 8.

According to the above-described embodiment, it is possible to form the concave grooves 19, 20 improving a traction coefficient at a low cost. That is, as described above, the concave grooves 19, 20 form the angles α and β (the angles formed between the concave groove 19 or 20 and the imaginary concentric circle X) with respect to the circumferential direction of the disk 16 when viewed from a normal direction relative to the one-side surface (concave curve surface) 17 where the concave grooves 19, 20 are formed such that the angle on the inner diameter side of the disk 16 is larger than that on the outer diameter side thereof (the relationship α<β is satisfied). As described above, the concave grooves 19, 20 can be formed in such a manner that the working tool swings or moves at a constant speed in the diameter direction (and the axial direction) of the disk 16 in a state that the working tool for forming the concave grooves 19, 20 is brought into direct contact with the one-side surface 17 while rotating the disk 16 at a constant speed.

The reason is because a circumferential speed of the part processed by the working tool becomes faster from the inner side to the outer side in the diameter direction and thus the angle with respect to the circumferential direction becomes smaller as the circumferential speed becomes faster. Accordingly, it is possible to decrease the number of operations in which the working tool is brought into direct contact with the processed surface or moves away from the processed surface. Also, it is not necessary to change a feeding amount (a feeding speed) of the working tool in accordance with the position of the processed part in the diameter direction (for instance, it is not necessary to adjust the feeding speed in the diameter direction to be slow as it moves to the outside in the diameter direction).

Accordingly, it is possible to easily carry out the processing work of the concave grooves 19, 20 and to form the concave grooves 19, 20 at a low cost without uselessly increasing a price of the device for forming the concave grooves 19, 20. In addition, when the concave grooves 19, 20 are formed by the cutting process, the grinding process is carried out after the cutting process if necessary to remove small burrs formed on the processed surface.

In addition, the disk-side concave grooves 19, 19 and the power roller-side concave grooves 20, 20 may have the same groove depth, groove width, and groove pitches $P_{19}$ and $P_{20}$ ($P_{19}=P_{20}$) or may have dimensions different from each other ($P_{19} \neq P_{20}$). In this case, for instance, it is desirable to form one, of which durability is less, of the disk 16 and the power roller 8 so as to have a small groove depth. In addition, it is possible to form one, of which the groove can be easily formed, of the disk-side concave grooves 19, 19 and the power roller-side concave grooves 20, 20 so as to have a large groove depth. For instance, it is possible to form the power roller-side concave grooves 20, 20 with a concentric shape (or a spiral shape) so as to have a large groove depth or it is possible to form the disk-side concave grooves 19, 19 formed in a concave curve surface so as to have a large groove depth. In any case, the groove depth, the groove width, the groove pitches $P_{19}$ and $P_{20}$ of the disk-side concave grooves 19, 19 and the power roller-side concave grooves 20, 20 are set (regulated) in accordance with a required traction coefficient, durability, processing cost, and the like. In addition, the angles formed at the rolling contact area between the disk-side concave grooves 19, 19 and the power roller-side concave grooves 20, 20 are set (regulated) in the same way.

Second Embodiment

Figure 4A:
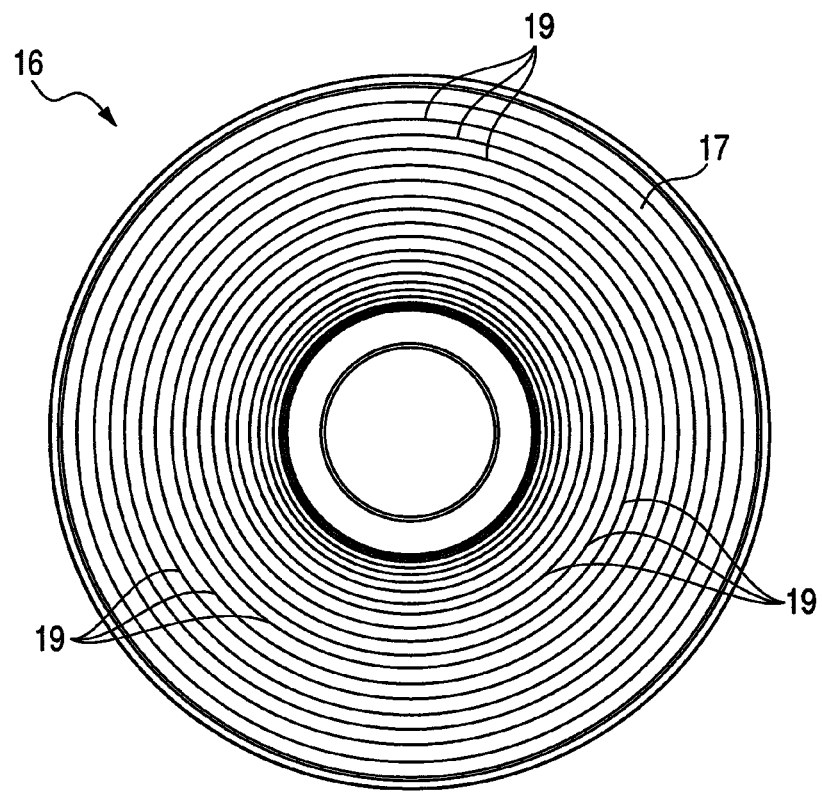
FIG. 4A is a top view of a disk of the second embodiment in which a concave grove is enlarged.
Figure 4B:
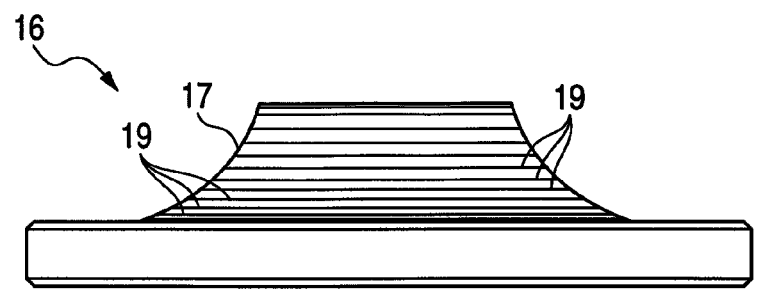
FIG. 4B is a side view of a disk of the second embodiment in which a concave grove is enlarged.
Figure 5A:
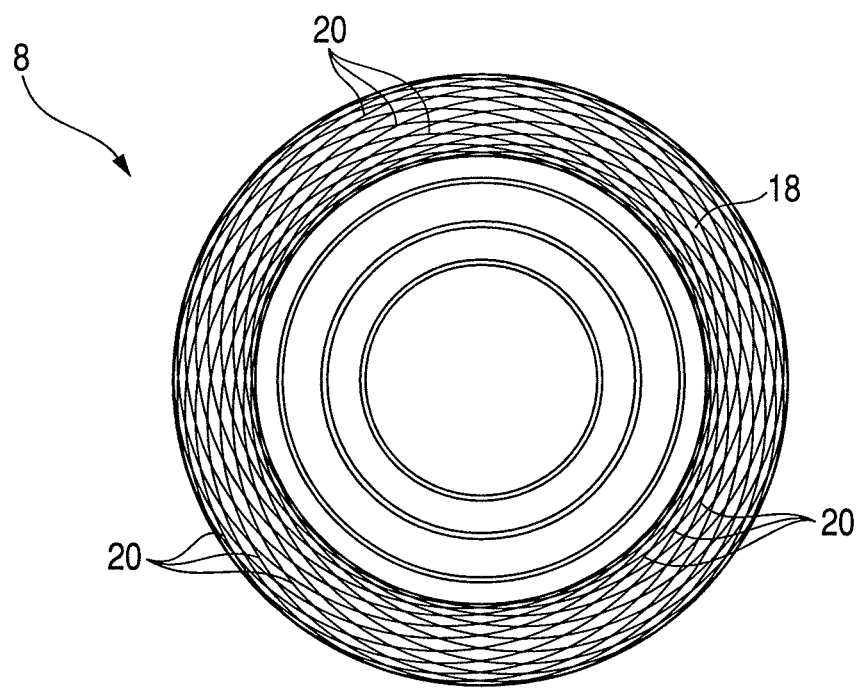
FIG. 5A is a top view of the power roller of the second embodiment in which the groove is enlarged.
Figure 5B:
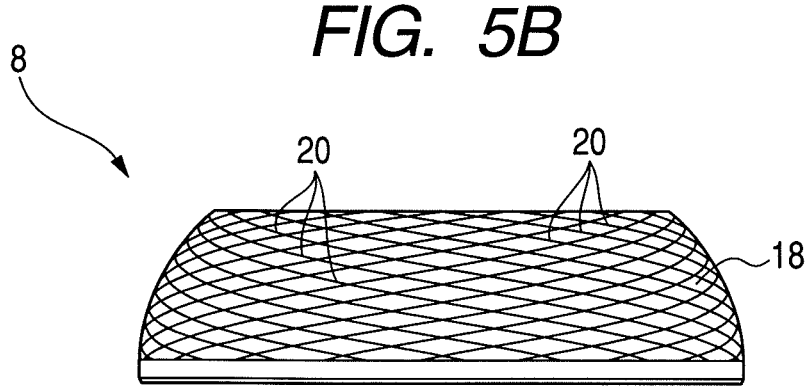
FIG. 5B is a side view of the power roller of the second embodiment in which the groove is enlarged.

FIGS. 4 and 5 show a second embodiment of the invention. In this embodiment, as shown in FIG. 4, the disk-side concave grooves 19, 19 are formed into a concentric shape (or a spiral shape) about the central shaft (rotation shaft) of the disk 16. Meanwhile, as shown in FIG. 5, the power roller-side concave grooves 20, 20 are formed so as to have angles with respect to the circumferential direction of the power roller 8 when viewed from a normal direction relative to the peripheral surface 18 of the power roller 8. Then, in this embodiment, the angles are formed such that an angle on the inner diameter side of the power roller 8 is larger than that on the outer diameter side thereof.

The other configurations, effects, and methods of forming the power roller-side concave grooves 20, 20 are the same as those of the first embodiment described above except that the concave grooves having the angles are the power roller-side concave grooves 20, 20 and the surface (the peripheral 18) where the power roller-side concave grooves 20, 20 are formed is a spherical convex surface (convex curve surface). Accordingly, the repetitive description will be omitted.

Third Embodiment

Figure 6A:
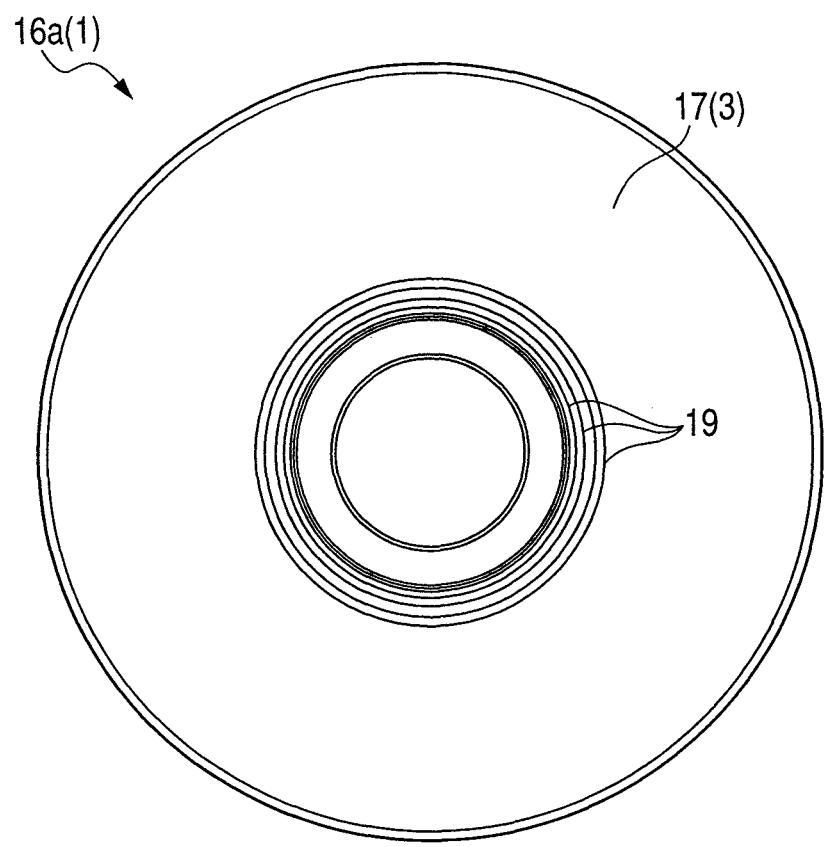
FIG. 6A is a top view of an input-side disk of the third embodiment in which the groove is enlarged.
Figure 6B:
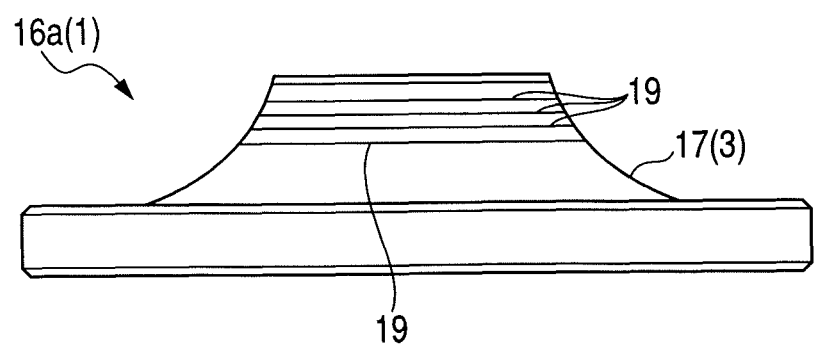
FIG. 6B is a side view of the input-side disk of the third embodiment in which the groove is enlarged.
Figure 7A:
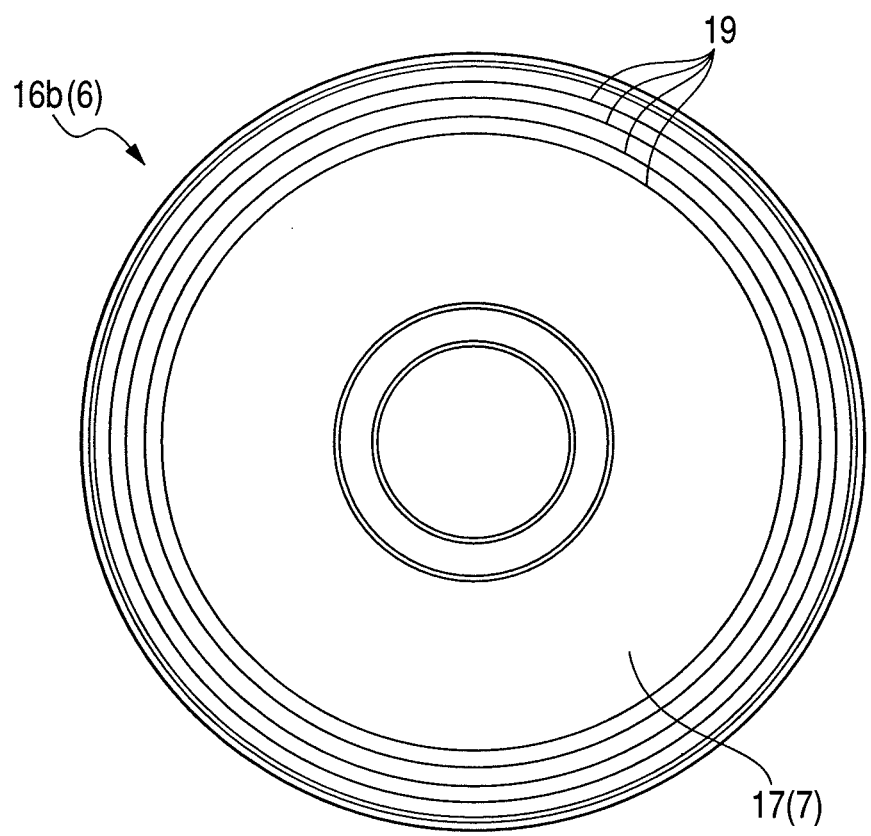
FIG. 7A is a top view of an output-side disk of the third embodiment in which the groove is enlarged.
Figure 7B:
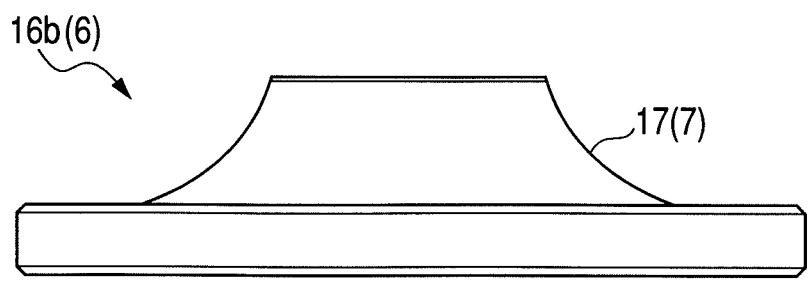
FIG. 7B is a side view of the output-side disk of the third embodiment in which the groove is enlarged.
Figure 8A:
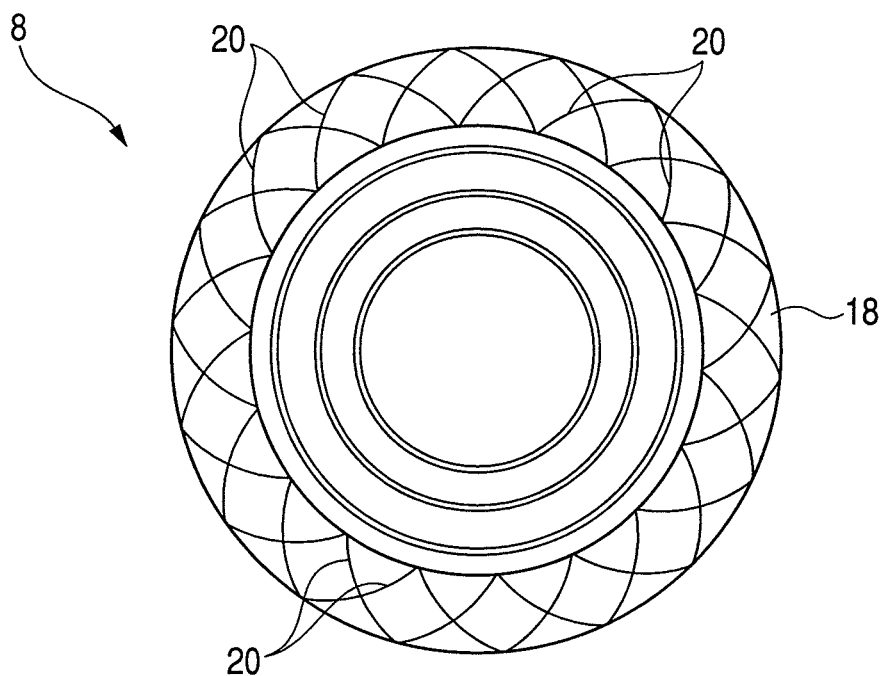
FIG. 8A is a top view of the power roller of the third embodiment in which the groove is enlarged.
Figure 8B:
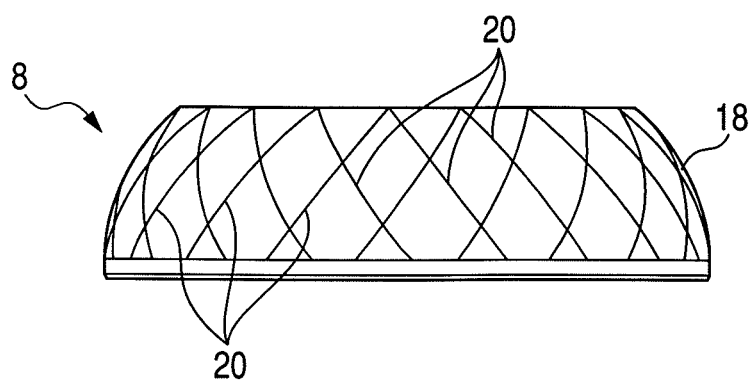
FIG. 8B is a side view of the power roller of the third embodiment in which the groove is enlarged.

FIGS. 6 to 8 show a third embodiment. In this embodiment, in the same way as the second embodiment described above, the disk-side concave grooves 19, 19 are formed into a concentric shape (or a spiral shape) about the central shaft (rotation shaft) of disks 16a and 16b. However, in this embodiment, the disk-side concave grooves 19, 19 are formed only in a part where the peripheral surface 18 of the power roller 8 comes into rolling contact with the one-side surface 17 of the disks 16a and 16b in the axial direction in a state of a transmission gear ratio particularly necessary to ensure a traction coefficient (the disk-side concave grooves 19, 19 are not formed on the whole one-side surface 17). Specifically, as described in FIG. 9, when the transmission gear ratio between the input-side disks 1 and 1 and the output-side disks 6 and 6 is in a deceleration state, the disk-side concave grooves 19, 19 are formed only in a part where the peripheral surface 18 of the power roller 8 comes into direct contact with the input-side and output-side inner surfaces 3 and 7 of the disks 1 and 6.

Accordingly, in this embodiment, as shown in FIG. 6, the disk-side concave grooves 19, 19 which are formed in the disk 16a corresponding to the input-side disk 1 are formed only in a part of one-side surface (input-side inner surface) 17(3) of a disk 16a(1) in the axial direction from the inside portion in the diameter direction to the inner end portion. On the contrary, as shown in FIG. 7, the disk-side concave grooves 19, 19 which are formed in the disk 16b corresponding to the output-side disk 6 are formed only in a part of one-side surface (output-side inner surface) 17(7) of a disk 16b(6) in the axial direction from the outside portion in the diameter direction to the outer end portion.

In addition, in this embodiment, as shown in FIG. 8, the power roller-side concave grooves 20, 20 are formed so as to have angles with respect to the circumferential direction of the power roller 8 when viewed from a normal direction relative to the peripheral surface 18 of the power roller 8. Then, in this embodiment, the angles are formed such that an angle on the inner diameter side of the power roller 8 is larger than that on the outer diameter side thereof. However, in this embodiment, the number of the power roller-side concave grooves 20, 20 is fewer and the groove pitch and groove width are larger than those of the power roller-side concave grooves 20, 20 (see FIG. 5) described in the second embodiment.

In this embodiment, the disk-side concave grooves 19, 19 and the power roller-side concave grooves 20, 20 are not opposed to each other in the rolling contact area (traction area) of the whole transmission range of the toroidal continuously variable transmission. However, angles are formed between the power roller-side concave grooves 20, 20 and the disk-side concave grooves 19, 19 during a deceleration, that is, in a state that the power roller-side concave grooves 20, 20 and the disk-side concave grooves 19, 19 are opposed to each other in the rolling contact area. In case of this embodiment in which the disk-side concave grooves 19, 19 are formed in a part corresponding to a rolling contact area under such a deceleration state, it is possible to reduce a maximum load applied to the trunnion 9 (see FIGS. 9 and 10), the input rotary shaft 2, or a thrust ball bearing rotatably supporting the power roller 8, thereby realizing a compact in size of the apparatus. Regarding this point, the same applies to the first and second embodiments.

Since the other configurations and effects are the same as those of the first and second embodiments, the repetitive description thereof will be omitted.

In addition, although it is not shown, the disk-side concave grooves may be formed only in a part where the input-side and output-side inner surfaces of the input-side and output-side disks come into direct contact with the peripheral surface of the power roller in a state where the transmission gear ratio is in an acceleration state. In addition, the disk-side concave grooves may be formed only in a part coming into direct contact with the peripheral surface of the power roller in a state where the transmission gear ratio is '1'.

In the above-described embodiments, one concave grooves of the disk-side concave grooves and the power roller-side concave grooves have angles with respect to the circumferential direction and the other concave grooves are formed into a concentric shape (or a spiral shape) (do not have angles). However, it is possible to configure such that both the disk-side concave grooves and the power roller-side concave grooves have angles with respect to the circumferential direction. In any case, regardless of the transmission gear ratio of the toroidal continuously variable transmission, the power roller-side concave grooves and the disk-side concave grooves are in the distortional relation in the rolling contact area. For instance, when viewed from the normal direction relative to the rolling contact area, the angled between the disk-side and the power roller-side concave angle is in the range of 5 to 90 degree and more desirably in the range of 5 to 45.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A toroidal continuously variable transmission, comprising:
  a pair of disks having an axially one-side surface of which sectional shape is toroidal, respectively, the disks being supported rotatably and coaxially with each other in a state that the respective axially one-side surface opposes to each other; and
  a plurality of power rollers arranged along with a circumferential direction of the disks between the respective axially one-side surface, the respective power rollers having a peripheral surface being made contact with the axially one-side surface of each of the pair of disks, wherein
  a plurality of disk-side concave grooves are formed on the axially one-side surface of each of the pair of disks,
  wherein a plurality of power roller-side concave grooves are formed on the peripheral surface of the power roller,
  wherein regardless of a transmission ratio, at a rolling contact area between the disk and the power roller, the disk-side concave grooves and the power roller-side grooves are in a distortional relation,
  wherein one of either the plurality of disk-side concave grooves formed on the pair of disks or the plurality of power roller-side grooves formed on the plurality of power rollers are formed as concentric or spiral grooves about an axis of the corresponding disk or power roller on which the grooves are formed, and wherein the other of either the plurality of disk-side concave grooves formed on the pair of disks or the plurality of power roller-side grooves formed on the plurality of power rollers are formed so as to form angles with respect to the circumferential direction of the corresponding disk or power roller on which the grooves are formed, when viewed from a normal direction relative to the one-side surface in an axial direction of the corresponding disk or power roller on which the grooves are formed.

2. The toroidal continuously variable transmission, as set forth in claim 1, wherein
the disk-side concave grooves are formed on only a radially part of the axially one-side surface of each of the pair of disks so that the disk-side concave grooves do not continuously meet with the power roller-side concave grooves.

3. The toroidal continuously variable transmission, as set forth in claim 1, wherein
at the rolling contact area, when viewed from a normal direction relative to the rolling contact area, the disk-side concave grooves intersect with the power roller-side concave grooves at angles of 5 to 90 degree.

4. The toroidal continuously variable transmission, as set forth in claim 3, wherein
at the rolling contact area, when viewed from a normal direction relative to the rolling contact area, the disk-side concave grooves intersect with the power roller-side concave grooves at angles of 5 to 45 degree.

5. The toroidal continuously variable transmission, as set forth in claim 1, wherein
when viewed from a normal direction relative to a surface on which the respective concave grooves are formed, at least one of the disk-side concave grooves and the power roller-side concave grooves intersects with a circumferential direction of the disk or the power roller at certain angles and
the concave grooves are arranged such that the angle defined between the concave groove of radially inner side and the circumferential direction is larger than the angle defined between the concave groove of radially outer side.

* * * * *